(12) United States Patent
Pursifull et al.

(10) Patent No.: US 7,448,361 B1
(45) Date of Patent: Nov. 11, 2008

(54) DIRECT INJECTION FUEL SYSTEM UTILIZING WATER HAMMER EFFECT

(75) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/877,489

(22) Filed: Oct. 23, 2007

(51) Int. Cl.
*F02M 69/46* (2006.01)
*F02M 69/54* (2006.01)

(52) U.S. Cl. .................. 123/456; 123/179.17
(58) Field of Classification Search .......... 123/502, 123/510, 446, 447, 456, 457, 458, 179.1, 123/179.8, 179.17
See application file for complete search history.

(56) References Cited

U.S. PATENT DOCUMENTS

| | | | |
|---|---|---|---|
| 5,546,912 A | 8/1996 | Yamada et al. | |
| 5,555,872 A | 9/1996 | Takeuchi et al. | |
| 5,758,622 A * | 6/1998 | Rembold et al. | 123/456 |
| 5,832,898 A | 11/1998 | Wakeman | |
| 5,842,454 A | 12/1998 | Miwa et al. | |
| 5,884,597 A | 3/1999 | Hiraku et al. | |
| 6,021,763 A * | 2/2000 | Yoshihara et al. | 123/516 |
| 6,024,064 A | 2/2000 | Kato et al. | |
| 6,065,335 A | 5/2000 | Denz et al. | |
| 6,065,436 A * | 5/2000 | Koga et al. | 123/179.17 |
| 6,135,090 A | 10/2000 | Kawachi et al. | |
| 6,142,127 A | 11/2000 | Maass | |
| 6,234,128 B1 * | 5/2001 | Reuss | 123/179.17 |
| 6,474,310 B2 | 11/2002 | Joos et al. | |
| 6,520,156 B2 * | 2/2003 | Kojima | 123/456 |
| 6,651,630 B2 | 11/2003 | Hiraku et al. | |
| 6,918,367 B2 | 7/2005 | Denz et al. | |
| 6,988,488 B2 | 1/2006 | Pursifull et al. | |
| 7,021,261 B2 | 4/2006 | Joos et al. | |
| 7,055,505 B2 | 6/2006 | Washeleski et al. | |
| 7,066,152 B2 | 6/2006 | Stroia et al. | |
| 7,089,914 B2 * | 8/2006 | Joos et al. | 123/456 |
| 7,093,576 B2 | 8/2006 | DeRaad | |
| 7,201,128 B2 * | 4/2007 | Freisinger | 123/179.17 |
| 2004/0250795 A1 | 12/2004 | Stroia et al. | |
| 2006/0200300 A1 | 9/2006 | Bryan et al. | |

FOREIGN PATENT DOCUMENTS

EP 0922850 6/1999

* cited by examiner

*Primary Examiner*—Mahmoud Gimie
(74) *Attorney, Agent, or Firm*—Allan J. Lippa; Alleman Hall McCoy Russell & Tuttle, LLP

(57) ABSTRACT

A method is described for operating a fuel system during start up, the system utilizing gasoline direct injection for an internal combustion engine including a first pump and second pump, an electromechanical valve, and a check valve fluidly coupled downstream of the first pump. The fuel system further includes a fuel rail downstream of the check valve and direct fuel injectors coupled to the engine. The method includes generating a flow of fuel in the fuel system via the first pump during an engine start before ignition of the engine; actuating the valve during the fuel flow to generate a pressure wave that travels through the fuel system past the check valve; and injecting fuel via the direct fuel injectors at an increased pressure generated by the pressure wave and held in the fuel rail via the check valve.

17 Claims, 2 Drawing Sheets

DIRECT INJECTION FUEL SYSTEM UTILIZING WATER HAMMER EFFECT

BACKGROUND AND SUMMARY

Many internal combustion engine utilize Gasoline Direct Injection (GDI) to increase the power efficiency and range over which the fuel can be delivered to the cylinder. One potential issue with GDI is that under lower injection pressures the fuel may not sufficiently mix with the air in the cylinder. Insufficient mixing may decrease engine power and efficiency, and increase emissions, at least under some conditions. For example, during cold engine starts, and before the catalytic converter is activated, insufficient mixing may exacerbate cold start emissions.

One approach to provide more rapid pressure rise during engine starting (e.g., before the high pressure pump is able to provide sufficient pressure increase) may include utilizing a method for generating a high pressure wave, such as a fluid hammer, that propagates downstream of the high pressure pump through into the fuel rail. The fluid hammer can occur when the motion of the fluid in a passageway is forced to stop or change direction suddenly.

Thus, while many attempts may take actions to mitigate such high pressure waves, the above approach uses the wave to increase the pressure in the fuel rail before engine start up. By utilizing the high pressure wave created by the fluid hammer to increase the pressure in the fuel rail before or during start up of the lift pump located in the fuel tank, and before full activation of the high pressure pump, it is possible to obtain increased pressure rise. This can lead to decreased lift pump size, and increased overall fuel system efficiency.

BRIEF DESCRIPTION

DETAILED DESCRIPTION

Figure 1:
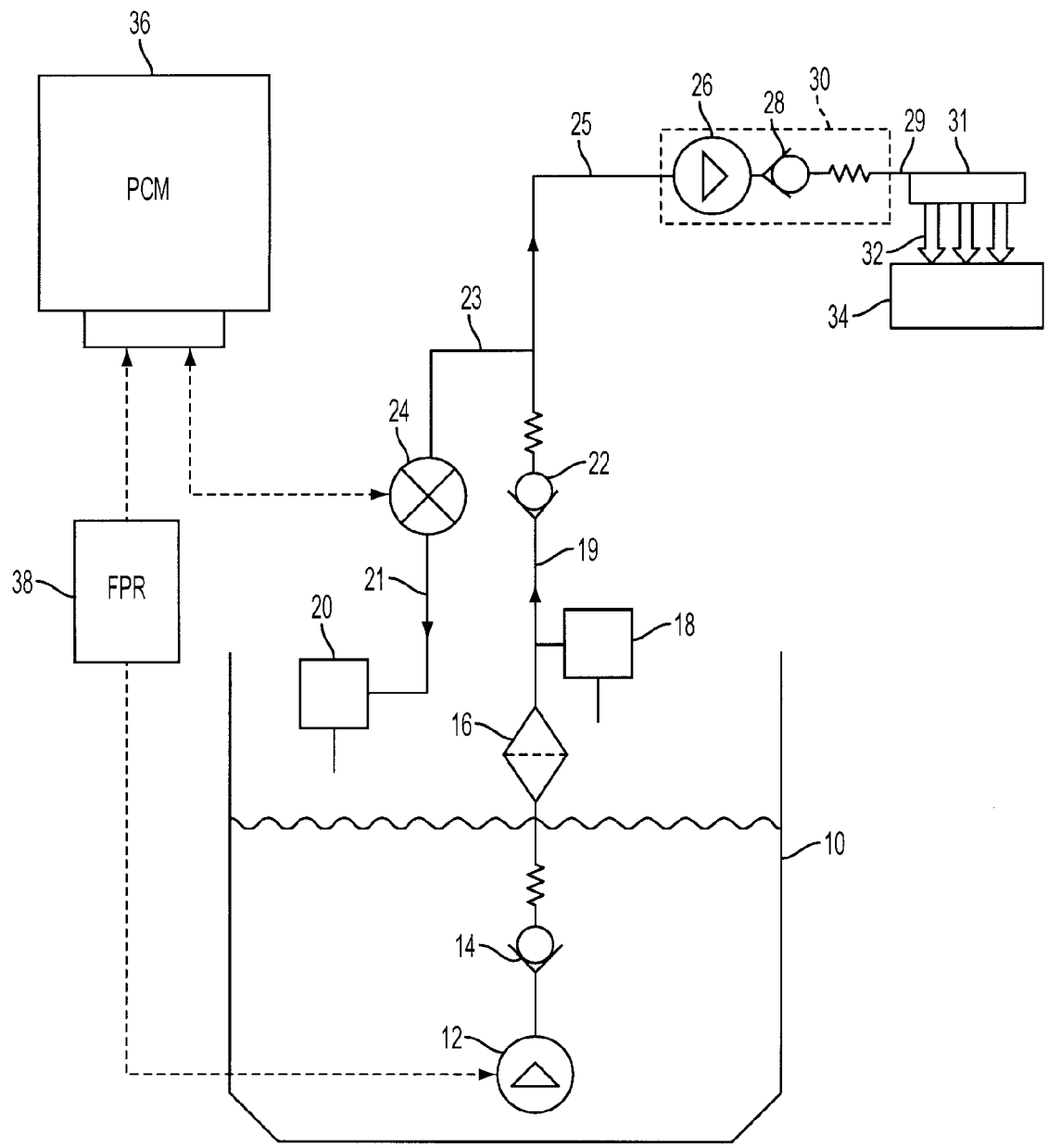
FIG. 1 shows a schematic diagram of the fuel delivery system.

FIG. 1 shows a schematic depiction of a fuel delivery system for an internal combustion engine that utilizes gasoline direct injection GDI. Pump 12 is fluidly coupled to check valve 14. In this embodiment pump 12 is an electronically controlled variable speed lift pump. In alternate embodiments pump 12 may only operate at a limited number of speeds. In this embodiment check valve 14 includes a ball and spring mechanism that seats and seals at a specified pressure differential. In alternate embodiment there may be a series of check valves fluidly coupled to further impede fuel from leaking back upstream of the valves. Check valve 14 is fluidly coupled to a filter 16. Filter 16 removes small impurities that may be contained in the fuel that may damage vital engine components. Filter 16 is fluidly coupled to the high pressure regulator 18. In this embodiment the high pressure regulator allows the fuel to stay at 80 pounds per square inch in fuel line 19. In alternate embodiments the pressure may be changed depending on the composition of the fuel and parameters of the system.

Fuel tank 10 encloses pump 12, valve 14, filter, 16, high pressure regulator 18, and low pressure regulator 20. This group of components is referred to as the fuel delivery mechanism. The fuel delivery mechanism provides higher pressure fuel to components downstream of the device. The fuel tank may contain any fuel suitable for an internal combustion engine such as gasoline, a methanol blend such as E85, or diesel.

Low pressure regulator 20 allows the pressure in fuel line to stay at 65 PSI when fuel is re-circulating back into the fuel tank. The bypass circuit consists of fuel line 23, bypass valve 24, fuel line 21, and the low pressure regulator. Check valve 22 is fluidly coupled downstream of the high pressure regulator by fuel line 19. In this embodiment check valve 22 may seat and seal when a back pressure is experienced. In alternate embodiment this pressure differential may be altered to account for a modification of various system parameters. Bypass valve 24 is fluidly coupled to the low pressure regulator by fuel line 21. Bypass valve 24 is fluidly coupled to fuel line 25, downstream check valve 22. Bypass valve controls the amount of fuel that is re-circulated into the gas tank. In this embodiment the bypass valve is an electromechanically actuated solenoid valve. In alternate embodiments other valve structures may be used that can rapidly turn on and off to generate a water hammer effect, as described herein. In some embodiments the electromechanically actuated solenoid valve may have two positions. The first position is an open position where the valve is completely open, allowing as much fluid as possible to pass through the valve. The second position is a closed position where the valve is completely closed, allowing as little fluid as possible to pass through the valve. In other embodiments the electromechanically actuated solenoid valve may have a plurality of positions to precisely regulate the flowrate of the fluid through the valve. Recirculation may occur during all the modes of operation of the fuel delivery system. High pressure pump 30 is fluidly coupled to check valve 22 through fuel line 25. The high pressure pump includes pump 26 and check valve 28. In this embodiment pump 26 is mechanically controlled. The high pressure pump provides fuel at specified pressures and flowrates to fuel injectors 32. Check valve 28 impedes fuel from leaking from the fuel rail back to the supply line. Fuel line 29 and fuel rail 31 fluidly connect the high pressure pump and the fuel injectors. In this embodiment the fuel injectors include direct cylinder injectors. In alternate embodiment the fuel injectors may be port fuel injectors, or combinations of port and direct injectors. The fuel injectors provide fuel to the cylinders in the engine. In this embodiment there are 6 cylinders in the engine. In alternate embodiments other number of cylinders may be used.

Figure 2:
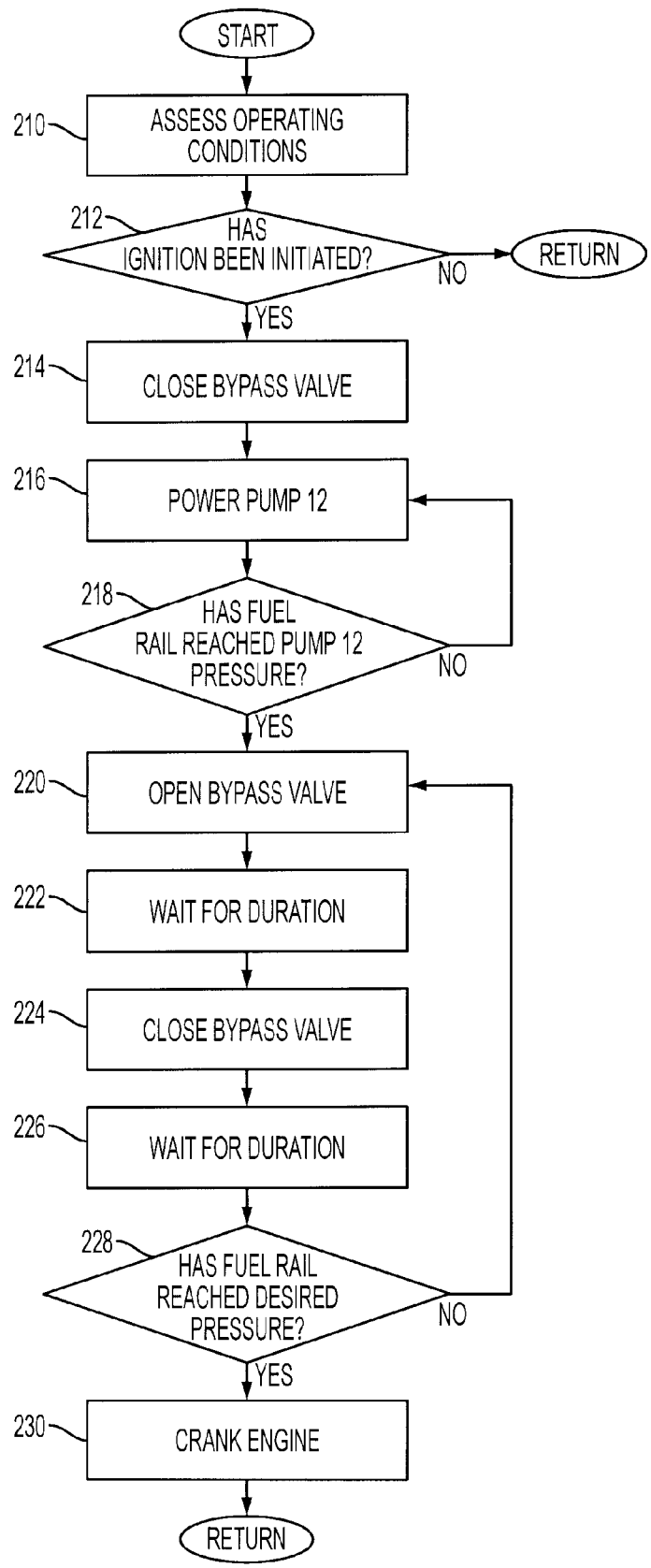
FIG. 2 shows a flowchart that depicts a method for operating the fuel delivery system when ignition has been initiated.

The PCM 36 is electronically coupled to bypass valve 24 and pump 12. The PCM can electronically control actuation of both the bypass valve and pump 12, as well as the stroke of pump 26. The fuel pressure regulator (FPR) is electronically coupled between the PCM and pump 12. The FPR can alter the signal that is produced by the PCM. In some embodiments the FPR may amplify the electronic signal produced by the PCM to drive pump 12 at the required speed. In alternate embodiments the FPR may modify the signal sent from the PCM to actuate pump 12 at specified times as illustrated in FIG. 2.

The fuel delivery system may operate in three modes. The first mode is a normal mode of operation. During the normal mode of operation both of the pumps are driven and the fuel injectors are supplying the engine with a specified amount of fuel that may be determined by a variety of operating conditions. Fuel is traveling from the fuel tank through pump 12, through the various regulators filters and check valve to the high pressure pump, through the fuel rail, fuel injectors, and into the cylinders in the engine. Recirculation of the fuel through bypass valve 24 may occur under certain operating conditions. This results in 65 psi fuel line pressure if a bypass flow exists. In alternate embodiments the bypass valve may be closed during this mode of operation. This results in 80 psi fuel line pressure if a bypass flow exists.

The second mode is referred to as a start up mode of operation. The start up mode occurs prior to engine ignition, such as during cranking, before cranking, etc. The start up mode may be initiated in a number of ways such as rotation of the key ignition or opening of the driver's door. Other indications that the engine ignition might occur, may also be used. The start up mode may be used to increase the pressure delivered by the injectors during start up to increase the efficiency and decrease the emissions of the engine. In one embodiment, the start up mode includes sudden actuation of bypass valve 24 to generate a water hammer effect pressure wave in the fuel system, where a downstream check valve (e.g., 28) causes the wave to be captured in the fuel rail to rapidly increase fuel rail pressure. Such operation is described further with regard to FIG. 2. The high pressure fuel is trapped in the fuel lines 23 and 24 upon the closure of valve 24. The high pressure fuel is also trapped behind check valve 28. An additional valve purposely-designed for fast sealing may be optionally placed in line 25 to capture high pressure fuel. This allows extra design freedom with respect to the design of check valve 28. Of course, since pump 30 may be an electrically-controlled inlet check valve (not shown) as well as an outlet check valve 28, it also can function to trap the high pressure fuel compression wave.

The third mode is a hot engine re-start mode where bypass valve 24 is held in a fixed position during the engine start when the fuel rail pressure is above a threshold value. The high fuel line pressure may also be advantageous when the fuel is hot. High fuel pressure prevents "vapor lock". The threshold value may be predetermined. In alternate embodiments the threshold value may be calculated prior to or during engine start up based on the composition of the fuel enclosed by the fuel delivery system. One or both of the pumps may be actuated in the hot engine re-start mode. This mode is most likely to occur when the temperature of the engine is considerably higher than the ambient temperature.

FIG. 2 illustrates a flow chart of an exemplary method for operating fuel delivery system before ignition of the engine has occurred when the engine is operated in the start up mode. Generally method 200 increases the pressure in fuel line 31 causing an air to dissolve into or fuel vapor to collapse into the liquid fuel, if present, and fuel rail pressure to rise to a desired starting pressure for initial combustion in the engine. The pressure rise during the engine start up and length of the engine start up can thereby be decreased due to the increased pressure in fuel rail 31.

At 210 various operating conditions are assessed. In this embodiment the operating condition may be assessed by a controller located in the engine, including PCM 36. These conditions may include key position, crank angle, engine temperature, position of the driver side door, and the pressure in fuel line 31.

The routine moves to 212 where it is determined whether or not ignition has been initiated. If the ignition has not been initiated the routine returns to the start. As noted above, the ignition may be initiated via driver key actuation, a request from the PCM, a driver door opening/closing indication, a key-fob signal, etc.

However, if ignition has been initiated the routine proceeds to 214-216 where bypass valve 24 is closed and pump 12 is powered. The preceding actions increase the pressure in the fuel rail and generate fluid flow. The closure of the bypass valve may be performed by actuation of the bypass valve. The system may transition the fuel system to as high of a pressure as the lift pump system can support before utilizing the water hammer effect to increase it further. Further, the system may operate to accelerate the bypass flow rate to maximum.

The routine then advances to 218 where it is determined whether or not the pressure in fuel line 25 is approaching the pressure delivered by pump 12. If the pressure in the fuel rail is not approaching the lift pump pressure the routine moves to 216 where pump 12 is driven again. In alternate embodiments step 218 may be removed and pump 12 may be driven for a predetermined amount to eliminate a need for a pressure sensor located in the fuel rail.

If the pressure in fuel line 25 is approaching the pressure in pump 12 the routine proceeds steps 220, 222, and 224 where the bypass valve is opened, a specified time elapses, and the bypass valve is then closed. In this embodiment the specified time is 30 milliseconds, however this time may be adjusted to account for changes of various parameters in the system, such as fuel line diameter and length, as well as engine and ambient conditions, such as ambient temperature, etc. In alternate embodiments the routine may wait until the pressure in re-circulation circuit approaches 65 PSI to close the bypass valve. Closing the bypass valve abruptly, at step 224, generates a high pressure wave that reflects off of the bypass valve and propagates back down the fuel line to the high pressure pump, increasing the pressure in fuel line 31. This phenomenon may be referred to as a water hammer effect. In some embodiments the pump 12 may be turned off, to conserve energy, when the bypass valve is closed. In alternate embodiments the operation of the pump 12 may continue when the bypass valve is closed.

The process then advances to 226 where the system remains in the same state of operation for a predetermined amount of time, so the pulse wave generated by closing the bypass valve can be transmitted and trapped in fuel line 31. In alternate embodiments the amount of time that the system remains in the same state of operation may be calculated based on the timed rate of change of the pressure in fuel rail 31 or fuel line 29. For example if the timed rate of change of pressure in the fuel line is approaching zero, the duration of time that the system remained in the same state of operation would be decreased. However, if the timed rate of change of pressure in the fuel line is increasing than the time that the system remains in the same state of operation is increased.

The routine then proceeds to 228 where it is determined whether or not the pressure in fuel line 31 has reached a desired pressure. In this embodiment the desired pressure is 100 pound per square inch PSI. In alternate embodiments the desired pressure may be adjusted to account for fuel composition or system requirements. If the fuel line has not reached the desired pressure the system returns to 220 where the bypass valve is opened.

On the other hand, if fuel line 31 has reached a desired fuel line pressure then the routine proceeds to 230 where operation of the engine is initiated and the engine is cranked. The operation of the engine includes actuation of the injectors to deliver fuel for a first combustion event during an engine start. The routine then returns to the start.

Note that during some engine starts, such as hot restarts, the fuel rail pressure may already be sufficiently high (e.g., above 100 PSI), and thus actuation of the bypass valve can avoided, and thus the bypass valve may be maintained in a fixed position during the start (e.g., closed, open, etc.).

The water hammer effect that occurs in steps 224-226 is a phenomenon that may occur when the closure of a fluid passageway occurs suddenly. This phenomenon is also referred to as a fluid hammer. In this example, the fluid, gasoline, is slightly compressible and the pipe may be sufficiently flexible. When the bypass valve is closed, a pressure wave is created. The pressure wave reflects off of the closed valve and travels back down the pipe in the opposite direction. The pressure waves stops the motion of the fluid as it arrives. The kinetic energy in the water that is flowing down the passageway is transformed into the energy in the pressure wave. In a straight pipe the pressure wave travels longitudinally down the passageway, however when the pipe is curved the shock wave will bounce off of the walls. In a curved passageway the pressure wave will eventually propagate down the passageway, the time that is takes to travel down the tube may be increased. In this application, the high pressure shock wave travels down fuel line 23 and 25, eventually traveling through the high pressure lift pump. After the high pressure wave passes through the high pressure lift pump the pressure in the fuel rail is increased. Check valve 28 impedes fluid from traveling back upstream of the valve trapping the high pressure wave and allowing the fuel rail to reach a high pressure during start up. In the current application, sample a calculation may be carried out to determine the pressure rise over the existing steady state pressure that the water hammer creates. Various assumptions may or may not be included, such relating to fluid compressibility, pipe rigidity, flow velocity uniformity across the pipe, and the rate/speed of solenoid valve actuation. A calculated resultant pressure rise was 160 PSI, which may provide a significant pressure increase improvement for engine starting with direct injection, although even 100 PSI, or less, may be sufficient.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and nonobvious combinations and subcombinations of the various systems and configurations, and other features, functions, and/or properties disclosed herein. For example, a system may comprise a first pump; a second pump; a bypass circuit containing a (rapidly acting two position solenoid) valve; a check valve fluidly connected downstream of the first pump and upstream of the second pump; a fuel rail fluidly coupled downstream of the second pump; and a plurality of direct fuel injectors coupled to the fuel rail, without utilizing the water hammer effect, in one example condition.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a fuel system during start up utilizing gasoline direct injection for an internal combustion engine including a first pump and second pump, an electromechanical valve included in a bypass circuit fluidly coupled between the first and second pumps, and a check valve fluidly coupled downstream of the first pump, the fuel system further including a fuel rail downstream of the check valve and direct fuel injectors coupled to the engine, comprising;

generating a flow of fuel in the fuel system via the first pump during an engine start before ignition of the engine;

actuating the valve included in the bypass circuit during the fuel flow to generate a pressure wave that travels through the fuel system past the check valve; and injecting fuel via the direct fuel injectors at an increased pressure generated by the pressure wave and held in the fuel rail via the check valve.

2. The method of claim 1 wherein the valve is a solenoid valve, and said actuating include repeatedly actuating the valve to generate a plurality of pressure waves that travel through the system and past the check valve to repeatedly increase fuel pressure before engine combustion during the engine start.

3. The method of claim 2 further comprising actuating the valve in a bypass circuit that returns fuel to a fuel tank.

4. The method of claim 3 further comprising, during a second, hot engine re-start, holding the solenoid valve in a fixed position during the engine start when fuel rail pressure is above a threshold.

5. A method for operating a fuel system during start up utilizing gasoline direct injection for an internal combustion engine including a first pump, a check valve fluidly coupled downstream of the first pump, a second pump fluidly coupled downstream of the check valve, a bypass circuit including a bypass valve and a pressure regulator fluidly coupled between the check valve and the second pump, and a fuel rail fluidly coupled downstream of the second pump, comprising;

closing the bypass valve;

driving the first pump in a higher pressure mode while the bypass valve is closed until the fuel rail pressure has reached the pressure delivered by the first pump;

opening the bypass valve; and closing the bypass valve abruptly after a specified duration from the opening of the bypass valve to generate a high pressure wave that propagates downstream of the second pump to increase the fuel pressure in the fuel rail prior to ignition of the engine.

6. The method according to claim 5 wherein the specified duration is approximately 30 milliseconds.

7. The method according to claim 6 further comprising recirculating fuel around a bypass circuit fluidly coupled around the second pump having a check valve.

8. The method according to claim 7 where the system further includes a high pressure regulator fluidly coupled upstream of the check valve and downstream of the first pump, the method further comprising maintaining an increased pressure in the fuel line directly downstream of the regulator via the high pressure regulator.

9. The method according to claim 8 wherein the high pressure regulator maintains a fuel pressure of approximately 80 PSI in the fuel line directly downstream of the regulator.

10. The method of claim 9 wherein the first pump is electronically controlled.

11. The method of claim 9 wherein the bypass valve is a solenoid valve.

12. The method of claim 11 wherein the solenoid valve electronically actuated.

13. A system for delivering fuel to an internal combustion engine utilizing gasoline direct injection comprising;

a first pump;

a second pump;

a bypass circuit containing a valve;

a check valve fluidly connected downstream of the first pump and upstream of the second pump;

a fuel rail fluidly coupled downstream of the second pump;

a plurality of direct fuel injectors coupled to the fuel rail; and a controller that operates the first pump while the second pump is disabled to recirculate fuel into the fuel tank for a specified amount of time via the bypass circuit, abruptly closes the valve to generate a high pressure wave increasing the pressure in the fuel rail, and actuates the injectors to deliver fuel for a first combustion event during an engine start.

14. The system of claim 13 wherein controller opens and closes the valve repeatedly at least until the pressure in the fuel rail increases above 100 PSI.

15. The system of claim 13 wherein the valve is a two-position solenoid valve.

16. The system of claim 15 where the first pump is a mechanically driven high pressure fuel pump with a variable stroke adjusted responsive to the controller.

17. A method for operating a fuel system during start up utilizing gasoline direct injection for an internal combustion engine including a first pump and second pump, an electro-mechanical valve, and a check valve fluidly coupled downstream of the first pump, the fuel system further including a fuel rail downstream of the check valve and direct fuel injectors coupled to the engine, comprising:

generating a flow of fuel in the fuel system via the first pump during an engine start before ignition of the engine;

actuating the valve during the fuel flow to generate a pressure wave that travels through the fuel system past the check valve; and injecting fuel via the direct fuel injectors at an increased pressure generated by the pressure wave and held in the fuel rail via the check valve, the valve being a solenoid valve, said actuating including repeatedly actuating the valve to generate a plurality of pressure waves that travel through the system and past the check valve to repeatedly increase fuel pressure before engine combustion during the engine start.

* * * * *